United States Patent
Konrad et al.

(10) Patent No.: US 8,313,829 B2
(45) Date of Patent: Nov. 20, 2012

(54) SEALABLE POLYESTER FILM

(75) Inventors: Matthias Konrad, Kriftel (DE); Bodo Kuhmann, Runkel (DE); Gottfried Hilkert, Saulheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 621 days.

(21) Appl. No.: 12/554,712

(22) Filed: Sep. 4, 2009

(65) Prior Publication Data

US 2010/0062237 A1   Mar. 11, 2010

(30) Foreign Application Priority Data

Sep. 11, 2008   (DE) .................. 10 2008 046 780

(51) Int. Cl.
- *B32B 5/16* (2006.01)
- *B32B 5/00* (2006.01)
- *B29C 47/00* (2006.01)

(52) U.S. Cl. ...... 428/220; 428/336; 428/323; 264/210.1

(58) Field of Classification Search .................. 428/220, 428/336, 323

See application file for complete search history.

(56) References Cited

U.S. PATENT DOCUMENTS

| | | | | |
|---|---|---|---|---|
| 5,270,401 A | * | 12/1993 | Sham et al. | 525/420 |
| 2004/0146718 A1 | * | 7/2004 | Konrad et al. | 428/424.4 |
| 2004/0146727 A1 | * | 7/2004 | Klein et al. | 428/480 |
| 2008/0146703 A1 | * | 6/2008 | Kliesch et al. | 524/100 |

FOREIGN PATENT DOCUMENTS

| | | |
|---|---|---|
| EP | 0 026 006 A1 | 4/1981 |
| EP | 1 165 317 B1 | 8/2004 |
| WO | WO 95/09885 A1 | 4/1995 |
| WO | WO 00/46026 A1 | 8/2000 |
| WO | WO 2006/121759 A2 | 11/2006 |
| WO | WO 2007/093495 A1 | 8/2007 |
| WO | WO 2009/013284 A1 | 1/2009 |

* cited by examiner

*Primary Examiner* — David Sample
*Assistant Examiner* — Tahseen N Khan
(74) *Attorney, Agent, or Firm* — ProPat, L.L.C.

(57) ABSTRACT

The invention relates to a transparent heatsealable biaxially oriented polyester film including a base layer B and amorphous top layers A on each surface of the base layer B. The invention further relates to a process for producing the film and to the use thereof.

25 Claims, No Drawings

SEALABLE POLYESTER FILM

CROSS-REFERENCE TO RELATED APPLICATIONS

This application claims priority to German Patent Application 10 2008 046 780.4 filed Sep. 11, 2008 which is hereby incorporated herein by reference in its entirety.

FIELD OF THE INVENTION

The invention relates to a transparent heatsealable biaxially oriented polyester film comprising a base layer B and amorphous top layers A on each surface of the base layer B. The invention further relates to a process for producing the film and to the use thereof.

BACKGROUND OF THE INVENTION

In many industrial applications, solvent-based adhesives are used to laminate flat substrates. The background of this invention is the replacement of such adhesives by a film sealable on both sides.

Heatsealable polyester films in general are known and are used, for example, for packaging and industrial applications.

EP-A-0 026 006 describes an oriented sealable polyester film with an amorphous PETG sealing layer. It is produced by various lamination methods or by coextrusion of a blown film.

EP-B-1 165 317 describes a biaxially oriented sealable polyester film with an amorphous PETG sealing layer. The base layer of this film contains a high proportion of isophthalate/terephthalate, and so the film is substantially amorphous and can be deformed readily. As a result, the film, however, has a low mechanical strength, which has an adverse effect on processability particularly in the case of thin films.

WO-A-2006/121759 describes a biaxially oriented polyester film with thin sealing layers on both sides of the film. The film is particularly suitable for LAP sealing (front side to back side). Owing to the low layer thicknesses (less than 1 µm), the seal seam strength to other materials is, however, low.

SUMMARY OF ADVANTAGEOUS EMBODIMENTS OF THE INVENTION

It was thus an object of the present invention to provide a biaxially oriented polyester film which is heatsealable on both sides and does not have the disadvantages of the films according to the prior art and is notable especially for
  high seal seam strength to PVC and steel,
  good winding and processing performance and
  ease of producibility.

DETAILED DESCRIPTION OF ADVANTAGEOUS EMBODIMENTS OF THE INVENTION

The object is achieved in accordance with the invention by the provision of a transparent biaxially oriented heatsealable polyester film with a base layer B and amorphous top layers A, wherein
1) the amorphous top layers A
  a) have a thickness of 1 to 10 µm,
  b) comprises predominantly of copolyesters containing 15 to 40 mol % of CHDM,
  c) contain more than 0.05% by weight of external particles (based on the total weight of the top layer A),
2) the base layer B comprises polyester which contains 0.1 to 5 mol % of CHDM,
3) the film has a seal seam strength to itself, PVC and metal after sealing of greater than 2 N/15 mm (measured at 180° C., 4 bar, 0.5 s) and
4) the film has sliding friction of less than 0.5.

According to the invention, the top layers have a thickness of 1 to 10 µm, preferably 1.2 to 8 µm, more preferably 1.4 to 6 µm. When the thickness of the top layer is less than 1 µm, sealing is inadequate. In the case of top layers of greater than 10 µm, the winding performance of the film deteriorates.

The amorphous top layers are typically comprised of polyester to an extent of at least 90% by weight and contain 15 to 40 mol % of CHDM. In this range, the copolyesters have only very low crystallinity, if any, and are therefore suitable as a sealing raw material.

To achieve good winding and good processability of the film, the top layers include more than 0.05% by weight of particles, preferably more than 0.1% by weight and more preferably more than 0.15% by weight of particles (based on the total weight of the particular top layer). The size of the particles ($d_{50}$) is preferably within the range between 1.0 and 8.0 µm, more preferably from 2.0 to 7.0 µm. At $d_{50}$ values of less than 1.0 µm, the sliding friction of the film is too high. At $d_{50}$ values of greater than 8.0 µm, there are problems with the filtration of the polymer of the individual coextruded layers.

Typical particles which can be used in the top layers (A) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium salts, barium salts, zinc salts or manganese salts of the dicarboxylic acids used, carbon black, titanium dioxide, kaolin or particulate polymers, for example crosslinked polystyrene or acrylate particles. The type and amount of the particles is preferably selected such that the film remains transparent (haze<10%).

The base layer of the film includes 0.1 to 5 mol %, preferably 0.2 to 4.0 mol %, of CHDM. This increases the elongation of the film at break, and improves the producibility and processability. Since the breaking strength decreases simultaneously, the CHDM content should be at most 5 mol %.

The film exhibits good sealing properties to itself, to unplasticized and plasticized PVC and to metal. At temperatures significantly below the melting point of the base layer, the film adheres efficiently to the materials mentioned under pressure. After sealing at 180° C. (4 bar, 0.5 s), the seal seam strength in all cases is greater than 2 N/15 mm, preferably greater than 2.5 N/15 mm, more preferably greater than 3 N/15 mm.

Polymers Used for the Base Layer (B)

The base layer (B) of the film comprises a thermoplastic polyester which generally contains the following dicarboxylates and alkylenes, based in each case on the total amount of dicarboxylate or alkylene:
  more than 90 mol %, preferably more than 95 mol %, of terephthalate,
  more than 90 mol %, preferably more than 95 mol %, of ethylene,
  0.1 to 5.0 mol %, preferably 0.2 to 4.0 mol %, of 1,4-bismethylenecyclohexane.

Any further dicarboxylates and alkylenes present originate from other aliphatic or aromatic dicarboxylic acids or diols.

Suitable other aliphatic diols are, for example, diethylene glycol, triethylene glycol, aliphatic glycols of the general formula HO—$(CH_2)_n$—OH where n is an integer from 3 to 6 (especially propane-1,3-diol, butane-1,4-diol, pentane-1,5- diol and hexane-1,6-diol) or branched aliphatic glycols having up to 6 carbon atoms. Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are also very suitable.

Other aromatic dicarboxylic acids are preferably benzenedicarboxylic acids, naphthalenedicarboxylic acids, for example naphthalene-1,4- or -1,6-dicarboxylic acid, biphenyl-x,x'-dicarboxylic acids, especially biphenyl-4,4'-dicarboxylic acid, diphenylacetylene-x,x'-dicarboxylic acids, especially diphenylacetylene-4,4'-dicarboxylic acid, or stilbene-x,x'-dicarboxylic acids. Among the cycloaliphatic dicarboxylic acids, mention should be made of cyclohexanedicarboxylic acids, especially cyclohexane-1,4-dicarboxylic acid. Among the aliphatic dicarboxylic acids, the ($C_3$ to $C_{19}$)-alkanedioic acids are particularly suitable, where the alkane moiety may be straight-chain or branched.

Polymers for the Amorphous Top Layers (A)

The amorphous top layers (A) applied preferably by coextrusion to the base layer (B) comprises essentially copolyesters which are comprised predominantly of terephthalic acid units and of ethylene glycol and 1,4-bis(hydroxymethyl)cyclohexane (=1,4-cyclohexanedimethanol (CHDM)) units. The remaining monomer units originate from other aliphatic, cycloaliphatic or aromatic diols or dicarboxylic acids, as may also occur in the base layer. The preferred copolyesters are those formed from ethylene terephthalate and 1,4-cyclohexanedimethyleneterephthalate units. The proportion of ethylene terephthalate is 60 to 85 mol % and the corresponding proportion of cyclohexanedimethylene terephthalate 40 to 15 mol %. Preference is further given to copolyesters in which the proportion of ethylene terephthalate is 65 to 80 mol % and the corresponding proportion of cyclohexanedimethyleneterephthalate is 37 to 18 mol %, and very preferred are copolyesters in which the proportion of ethylene terephthalate is 70 to 80 mol % and the corresponding proportion of cyclohexanedimethylene terephthalate is 35 to 20 mol %.

The polyesters for the base and top layers of the inventive films can be prepared, for example, by the transesterification process. The starting materials are dicarboxylic esters and diols, which are converted using the customary transesterification catalysts such as zinc salts, calcium salts, lithium salts, magnesium salts and manganese salts. The intermediates are then polycondensed in the presence of generally customary polycondensation catalysts such as antimony trioxide, or titanium salts, aluminum salts or germanium salts. The preparation can equally be effected by the direct esterification process in the presence of polycondensation catalysts. This method starts directly from the dicarboxylic acids and the diols.

The base layer (B) may additionally comprise customary additives, for example UV stabilizers, flame retardants or hydrolysis stabilizers. These additives are appropriately added to the polymer or the polymer mixture actually before the melting. The stabilizers used are advantageously, for example, phosphorus compounds such as phosphoric acid or phosphoric esters.

The total thickness of the inventive polyester film may vary within wide limits. It is preferably 10 to 125 µm, especially 12 to 100 µm, preferably 15 to 75 µm.

According to the invention, the film has three layers and comprises the base layer B and the amorphous top layers A on each side of the base layer B.

The coefficient of sliding friction of less than 0.5 is achieved when the amorphous top layers contain the specified amount of particles of at least 0.05% in a size ($d_{50}$) of 1 to 8 µm.

The invention also relates to a process for producing the inventive polyester film by coextrusion processes known per se from the literature.

In the context of this process, the procedure is such that the melts corresponding to the individual layers A and B of the film are coextruded through a flat die, the film thus obtained is consolidated by drawing it off on one or more rolls, then the film is biaxially stretched and the biaxially stretched film is heatset.

The biaxial stretching is generally performed sequentially. This preferably involves stretching first in longitudinal direction (i.e. in machine direction=MD) and then in transverse direction (i.e. at right angles to machine direction=TD). This leads to an alignment of the molecule chains. Stretching in longitudinal direction can be performed with the aid of a plurality of rolls running at different speeds according to the desired stretching ratio. For transverse stretching, an appropriate tenter frame is generally used.

First, as usual in the coextrusion process, the polymer or the polymer mixtures for the individual layers are compressed and liquefied in an extruder, and any additives provided may already be present in the polymer or in the polymer mixture. The melts are then pressed simultaneously through a flat film die (slot die), and the extruded multilayer melt is drawn off on one or more draw rolls, in the course of which the melt cools and solidifies to a preliminary film.

The temperature at which the stretching is carried out may vary within a relatively wide range and is guided by the desired properties of the film. In general, the longitudinal stretching is performed at a temperature in the range from 80 to 130° C. and the transverse stretching in the range from 90 to 150° C. The longitudinal stretching ratio is generally in the range from 2.5:1 to 6:1, preferably from 3.0:1 to 5.5:1. The transverse stretching ratio is generally in the range from 3.0:1 to 5.0:1, preferably from 3.5:1 to 4.5:1.

In the subsequent heatsetting, the film is kept at a temperature of approx. 150 to 240° C. over a period of about 0.1 to 10 s. Subsequently, the film is wound up in a customary manner.

Properties

The table below (table 1) summarizes the most important film properties once again:

TABLE 1

| Property | Appropriate range | Preferred | Particularly preferred | Unit | Test method/remark |
|---|---|---|---|---|---|
| Thickness of the top layer | 1.0-10.0 | 1.2-8.0 | 1.4-6.0 | µm | |
| CHDM content of the top layers | 15-40 | 18-37 | 20-35 | mol % | |

TABLE 1-continued

| Property | Appropriate range | Preferred | Particularly preferred | Unit | Test method/remark |
|---|---|---|---|---|---|
| Particle content of the top layers | >0.05 | >0.10 | >0.15 | % by wt. | |
| CHDM content of the base layer | 0.1-5.0 | 0.2-4.0 | | mol % | |
| Sealing | >2.0 | >2.5 | >3.0 | N/15 mm | DIN 55529 180° C., 0.5 s |
| Coefficient of Sliding friction | <0.5 | <0.45 | <0.4 | | DIN 53375 |
| Gloss of the film | >100 | >110 | >120 | | DIN 67530, measurement angle 20° |
| Haze | <10 | <8 | <6 | % | ASTM D 1003-61 Method A |

The invention is illustrated in detail hereinafter with reference to examples. For the determination of the properties, the following test methods were used:

Seal Seam Strength (DIN 55529)

To determine the seal seam strength of the film to itself, two 15 mm-wide film strips of the inventive film are placed one on top of the other and pressed together at 180° C. for a time of 0.5 s at a pressure of 4 bar (equipment: Brugger NDS®, sealing jaw heated on one side). In order to prevent adhesion to the sealing jaw, a 12 μm-thick crystalline polyester film is placed between the inventive film and the sealing jaw. The seal seam strength (maximum force) is determined at a peel angle of 90° (90° peel method) at a speed of 200 mm/min.

To determine the seal seam strength of the film to metal or to PVC, a 15 mm-wide film strip with the amorphous side on a strip of ECCS steel sheet or PVC sheet of equal width. As described above, a crystalline 12 μm film is placed onto the inventive film in order to prevent adhesion to the sealing jaw. The seal seam strength (maximum force) is determined at a peel angle of 180° owing to the stiffness of the substrate. The material can be described as sealed when the force measured is >1 N/15 mm.

Haze

Haze is determined to ASTM D 1003-61 method A.

Friction

Friction is determined to DIN 53375. The coefficient of sliding friction is measured 14 days after production.

Gloss

Gloss is determined to DIN 67530 (angle of incidence 20°).

Mean Particle Diameter $d_{50}$

The determination of the mean particle diameter $d_{50}$ is performed by means of a laser on a MASTER SIZER® (Malvern Instruments, GB) by the standard method (other test instruments are, for example, HORIBA® LA 500 (Horiba Ltd., Japan) or HELOS® (Sympatec GmbH, Germany), which use the same measurement principle). To this end, the samples are introduced into a cuvette with water, which is then placed into the test instrument. The test procedure is automatic and also includes the mathematical determination of the $d_{50}$.

SV (Standard Viscosity)

The standard viscosity SV (DCA) is, based on DIN 53726, measured at 25° C., in dichloroacetic acid in a departure from the standard. The intrinsic viscosity (IV) of polyethylene terephthalate is calculated as follows from the standard viscosity:

$$IV=[\eta]=6.907*10^{-4}SV(DCA)+0.063096 [dl/g]$$

Example 1

To produce the film described below, the following starting materials were used:

| Tops layers A: | |
|---|---|
| 95% by weight | of copolyester I formed from 70 mol % of ethylene terephthalate and 30 mol % of cyclohexanedimethylene terephthalate with an SV of 1000 |
| 5% by weight | of masterbatch of 95% by weight of copolyester I and 5% by weight of SYLYSIA ® 430 (synthetic SiO$_2$ from Fuji, Japan; $d_{50}$: 3.4 μm) |
| Base layer B: | |
| 95% by weight | of polyethylene terephthalate with an SV of 800 |
| 5% by weight | of copolyester I of 80 mol % of ethylene terephthalate and 20 mol % of cyclohexanedimethylene terephthalate with an SV of 1000 |

The abovementioned raw materials were melted in one extruder each per layer and extruded through a three-layer slot die with the A-B-A structure onto a cooled draw roll. The amorphous preliminary film thus obtained was then first stretched longitudinally. Thereafter, the film was stretched transversely, heatset and rolled up (final thickness of the film 20 μm, top layers 2 μm each). The conditions in the individual process steps were:

| Longitudinal stretching: | Temperature: | 80-120° C. |
|---|---|---|
| | Longitudinal stretching ratio: | 4.0 |
| Transverse stretching: | Temperature: | 80-135° C. |
| | Transverse stretching ratio: | 4.0 |
| Heatsetting: | | 2 s at 230° C. |

The properties of the film thus obtained are listed in table 2.

Example 2

Compared to example 1, a 50 μm-thick film was now produced. The top layer thickness of the amorphous layers A was 5 μm. The seal seam strength is higher than in example 1.

Example 3

Compared to example 1, the particle content of the amorphous top layers A was now altered:

| Top layers A: | |
|---|---|
| 92% by weight | of copolyester I formed from 70 mol % of ethylene terephthalate and 30 mol % of cyclohexanedimethylene terephthalate with an SV of 1000 |
| 8% by weight | of masterbatch of 95% by weight of copolyester I and 5% by weight of SYLYSIA ® 430 (synthetic SiO$_2$ from Fuji, Japan; d$_{50}$: 3.4 μm) |

Compared to example 1, the winding performance has improved.

Comparative Example 1

Compared to example 1, the film was now altered analogously to WO-A-2006/121759, example 2. The total thickness of the film was 12 μm; the top layer thickness was 0.6 μm. The composition of the amorphous top layers A was:

| Top layers A: | |
|---|---|
| 94.4% by weight | of copolyester II formed from 81 mol % of ethylene terephthalate and 19 mol % of ethylene isophthalate with an SV of 850 |
| 5.6% by weight | of masterbatch of 95% by weight of copolyester II and 5% by weight of SYLYSIA ® 430 (synthetic SiO$_2$ from Fuji, Japan; d$_{50}$: 3.4 μm) |

The most important properties of the films thus produced are summarized in table 2 below.

TABLE 2

| | Ex 1 | Ex 2 | Ex 3 | C. Ex 1 |
|---|---|---|---|---|
| Film thickness (μm) | 20 | 50 | 20 | 12 |
| Thickness of the top layers A (μm) | 2.0 | 5.0 | 2.0 | 0.61 |
| Particle content of the top layers A (%) | 0.25 | 0.25 | 0.4 | 0.2 |
| Seal seam strength to itself, FIN (N/15 mm) | 3.5 | 4.2 | 3.2 | 1.6 |
| Seal seam strength to ECCS sheet (N/15 mm) | 3.3 | 4.0 | 3.1 | 1.8 |
| Seal seam strength to 150 (μm) PVC film (N/15 mm) | 5.8 | 6.4 | 5.5 | 0.2 |
| Coefficient of Sliding friction | 0.38 | 0.34 | 0.37 | 0.36 |
| Gloss of the film | 160 | 153 | 155 | 161 |
| Haze (%) | 3.4 | 4.1 | 3.8 | 3.4 |

The invention claimed is:

1. A multilayer biaxially oriented polyester film comprising a base layer B and at least one top layer A, wherein the top layer A
   a) has a thickness of 1 to 10 μm,
   b) comprises predominantly a copolyester containing 15 to 40 mol % of cyclohexane dimethylene terephthalate,
   c) contains more than 0.05% by weight of external particles, based on the total weight of the top layer A, the base layer B comprises
   polyester which includes from 0.1 to 5 mol % of 1,4-bismethylenecyclohexane,
and the film
   i) has a seal seam strength to itself, PVC and metal after sealing at 180° C., 4 bar, 0.5 s of greater than 2 N/15 mm, and
   ii) a sliding friction of less than 0.5.

2. The polyester film as claimed in claim 1, wherein the thickness of the top layer A is 1.2 to 8 μm.

3. The polyester film as claimed in claim 1, wherein the top layer A comprises more than 0.1% by weight of external particles.

4. The polyester film as claimed in claim 1, wherein the base layer B contains 0.2 to 4.0 mol % of 1,4-bismethylene cyclohexane.

5. The polyester film as claimed in claim 1, wherein the seal seam strength is greater than 2.5 N/15 mm.

6. The polyester film as claimed in claim 1, wherein the size of the particles, d$_{50}$, in the top layer A is 1.0 to 8.0 μm.

7. The polyester film as claimed in claim 1, wherein the particles of the top layer A are inorganic and/or organic particles.

8. The polyester film as claimed in claim 1, wherein the base layer B of the film comprises a thermoplastic polyester which includes the following dicarboxylates and alkylenes, based in each case on the total amount of dicarboxylate or total amount of alkylene:
   more than 90 mol % of terephthalate,
   more than 90 mol % of ethylene,
   0.1 to 5.0 mol % of 1,4-bismethylenecyclohexane.

9. The polyester film as claimed in claim 1, wherein the top layer A comprises 60 to 85 mol % of ethylene terephthalate and 40 to 15 mol % of cyclohexanedimethylene terephthalate.

10. The polyester film as claimed in claim 1, wherein the film has a total thickness of 10 to 125 μm.

11. The polyester film as claimed in claim 1, wherein the film has three layers and comprises the base layer B and one top layer A on each side of the base layer B.

12. The polyester film as claimed in claim 1, wherein the film has a coefficient of sliding friction of less than 0.5.

13. A process for producing a film as claimed in claim 1, comprising coextruding the melts corresponding to the individual layers A and B of the film through a flat die, consolidating the coextruded film by drawing the film off on one or more rolls, then biaxially stretching the film and heat setting and rolling up the biaxially stretched film, the top layer A having a thickness of 1 to 10 μm, predominantly comprising a copolyester containing 15 to 40 mol % of CHDM, and containing more than 0.05% by weight of external particles based on the total weight of the top layer A, and the base layer B comprising polyester which contains 0.1 to 5 mol % of CHDM.

14. Packaging film or laminating film comprising polyester film as claimed in claim 1.

15. The polyester film as claimed in claim 2, wherein the thickness of the top layer A is 1.4 to 6 μm.

16. The polyester film as claimed in claim 3, wherein the top layer A comprises more than 0.15% by weight of external particles.

17. The polyester film as claimed in claim 5, wherein the seal seam strength is greater than 3 N/15 mm.

18. The polyester film as claimed in claim 6, wherein the size of the particles, d$_{50}$, in the top layer A is 2.0 to 7.0 μm.

19. The polyester film as claimed in claim 7, wherein the particles of the top layer A are selected from the group consisting of calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium salts, barium salts, zinc salts or manganese salts of the polyester dicarboxylic acid, carbon black, titanium dioxide, kaolin, crosslinked polystyrene, crosslinked acrylate and mixtures of two or more thereof.

20. The polyester film as claimed in claim 8, wherein the base layer B comprises more than 95 mol % of terephthalate, more than 95 mol % of ethylene and 0.2 to 4.0 mol % of 1,4-bismethylenecyclohexane.

21. The polyester film as claimed in claim 9, wherein the top layer A comprises 65 to 80 mol % of ethylene terephthalate and 18 to 37 mol % of cyclohexane-dimethylene terephthalate.

22. The polyester film as claimed in claim 9, wherein the top layer A comprises 70 to 80 mol % of ethylene terephthalate and 20 to 35 mol % of cyclohexane-dimethylene terephthalate.

23. The polyester film as claimed in claim 10, wherein the film has a thickness of 12 to 100 μm.

24. The polyester film as claimed in claim 10, wherein the film has a thickness of 15 to 75 μm.

25. The packaging film or laminating film as claimed in claim 14, wherein said film is sealed to PVC film or a metallic substrate.

\* \* \* \* \*